(12) United States Patent
Boschet et al.

(10) Patent No.: US 7,807,090 B2
(45) Date of Patent: Oct. 5, 2010

(54) MOULD FOR A COMPOSITE MATERIAL PART COATED WITH A STRIPPING PRODUCT

(75) Inventors: Patrick Boschet, Montigny le Bretonneux (FR); Emmanuel Piel, Le Havre (FR)

(73) Assignee: Eurocopter, Marignane (FR)

( * ) Notice: Subject to any disclaimer, the term of this patent is extended or adjusted under 35 U.S.C. 154(b) by 399 days.

(21) Appl. No.: 10/533,446

(22) PCT Filed: Oct. 29, 2003

(86) PCT No.: PCT/FR03/03219

§ 371 (c)(1),
(2), (4) Date: Jul. 12, 2006

(87) PCT Pub. No.: WO2004/041947

PCT Pub. Date: May 21, 2004

(65) Prior Publication Data

US 2006/0255509 A1 Nov. 16, 2006

(30) Foreign Application Priority Data

Oct. 30, 2002 (FR) .................................. 02 13588

(51) Int. Cl.
*B28B 7/36* (2006.01)
*B28B 7/04* (2006.01)
*B29C 33/56* (2006.01)
*C08G 59/68* (2006.01)

(52) U.S. Cl. .................... 264/338; 264/39; 264/130; 264/213; 425/90; 106/38.2; 106/38.22; 249/115; 427/133; 427/135; 156/289; 522/31

(58) Field of Classification Search ................. 264/338
See application file for complete search history.

(56) References Cited

U.S. PATENT DOCUMENTS

| 2,811,408 | A | * | 10/1957 | Braley ........................ 264/338 |
| 3,321,019 | A | * | 5/1967 | Dimitroff et al. ........ 416/229 R |
| 4,256,870 | A | * | 3/1981 | Eckberg ...................... 528/15 |
| 4,681,714 | A | * | 7/1987 | Lopes et al. ................ 264/46.6 |
| 5,364,888 | A | * | 11/1994 | Aoki et al. ..................... 522/31 |
| 5,650,453 | A | * | 7/1997 | Eckberg et al. ............... 522/31 |
| 6,313,255 | B1 | | 11/2001 | Rubinsztajn |

FOREIGN PATENT DOCUMENTS

| EP | 0 473 995 A2 | 3/1992 |
| EP | 0 476 925 A2 | 3/1992 |
| EP | 0 599 615 A2 | 6/1994 |
| EP | 1 215 254 A2 | 6/2002 |
| WO | WO 00/77083 A1 | 12/2000 |
| WO | WO 02/06030 A1 | 1/2002 |

\* cited by examiner

*Primary Examiner*—Jeffrey Wollschlager
(74) *Attorney, Agent, or Firm*—Young & Thompson

(57) ABSTRACT

The invention relates to a mold for making a composite material part, the mold being coated in a stripping composition. The stripping composition comprises:
- 100 parts by weight of a base ingredient consisting in epoxy polydimethylsiloxane;
- 0.5 to 10 parts by weight of a polymerization agent for polymerizing the base ingredient and constituted by a diaryliodonium salt;
- not more than 30 parts by weight of an anti-adhesion modulator constituted by a silicone polymer; and
- not more than 40 parts by weight of an anti-stick agent making the composition less tacky prior to polymerization and constituted by at least one vinyl ether compound.

9 Claims, No Drawings

MOULD FOR A COMPOSITE MATERIAL PART COATED WITH A STRIPPING PRODUCT

CROSS REFERENCE TO RELATED APPLICATIONS

This is the 35 USC 371 national stage of international application PCT/FR2003/003219, filed on 29 Oct. 2003, which designated the United States of America.

FIELD OF THE INVENTION

The present invention relates to a mold for making a composite material part, the mold being coated in a stripping composition. Although not exclusively, the present invention applies particularly to helicopter blades or to helicopter blade elements, which are usually manufactured by molding a composite material.

BACKGROUND OF THE INVENTION

In order to make it easier to extract such blades or blade elements from the mold after polymerization, it is conventional initially to apply a stripping composition over the entire surface of the mold.

Known stripping compositions contain a large proportion of solvent, and as a result present numerous drawbacks, such as the large quantities that need to be used and the volatile organic compounds that are dumped into the environment.

SUMMARY OF THE INVENTION

An object of the present invention is to remedy those drawbacks. The invention relates to a mold coated in a solvent-free anti-adhesive stripping composition that is particularly effective.

To this end, according to the invention, a mold for making a composite material part is coated in a stripping composition comprising:
  100 parts by weight of a base ingredient consisting in epoxy polydimethylsiloxane;
  0.5 to 10 parts by weight of a polymerization agent for polymerizing the base ingredient and constituted by a diaryliodonium salt;
  not more than 30 parts by weight of an anti-adhesion modulator constituted by a silicone polymer; and
  not more than 40 parts by weight of an anti-stick agent making the composition less tacky prior to polymerization and constituted by at least one vinyl ether compound.

Preferably, the anti-adhesion modulator is also constituted by an epoxy polydimethylsiloxane.

As base ingredient and as adhesion modulator, it is possible to use respectively the products manufactured by the supplier Rhodia and having the following trade names respectively: UV POLY 200 and UV RCA 200. Similarly, the polymerization agent based on diaryliodonium salt can be that manufactured and sold under the trade name UV CATA 21 1 by said supplier Rhodia.

Said anti-stick agent (which serves amongst other things to enable the stripping composition to be spread easily on the walls of the mold and significantly to reduce the sticky appearance left by the epoxy polydimethylsiloxane when not polymerized) can be constituted by a mixture of a monovinyl ether and a divinyl ether.

In a preferred embodiment, the monovinyl ether is dodecyl monovinyl ether [formula $CH_3-(CH_2)_{11}-O-CH=CH_2$], while the divinyl ether is 1.4 cyclohexane dimethanol divinyl ether [formula $CH_2=CH-O-C_6H_{10}-O-CH=CH_2$].

Advantageously, said stripping composition adapted to the mold comprises:
  5 to 7 parts by weight of the polymerization agent;
  5 to 10 parts by weight of the anti-adhesion modulator, said anti-adhesion modulator being an epoxy polydimethylsiloxane; and
  the anti-stick agent being present at a concentration in the range 8 to 12 parts by weight of a dodecyl monovinyl ether and 8 to 12 parts by weight of a cyclohexane dimethanol divinyl ether.

More advantageously, the stripping composition has:
  6 parts by weight of the polymerization agent;
  8 parts by weight of the anti-adhesion modulator; and
  the anti-stick agent being present at a concentration of 11.4 parts by weight of a dodecyl monovinyl ether and 11.4 parts by weight of a cyclohexane dimethanol divinyl ether.

DETAILED DESCRIPTION OF THE INVENTION

Thus, by means of the invention, a solvent-free stripping composition is obtained which presents very good anti-adhesion properties, in particular because it is made on the basis of silicone. This stripping composition also presents good performance in terms of sticking behavior and painting behavior of the composite part made by molding. Because of the chemical characteristics of said composition which is based on epoxy siloxanes, the small amount that might be transferred during molding has no significant negative influence on the sticking properties or on the painting behavior of the part, contrary to that which can be observed with stripping compositions based on solvent.

It should be observed that compared with usual stripping compositions based on solvent, the composition of the invention obtained from the above-specified mixture also presents the following advantages:
  elimination of the problem of dumping volatile organic compounds;
  reduction in the quantity of composition consumed;
  reduction in the time required to apply the composition;
  improvement in the sticking characteristics on the composite material; and
  improvement in surface appearance.

The stripping composition of the invention polymerizes under the action of ultraviolet radiation or on application of heat. The polymerization cycle by heating may comprise 1 hour at 150° C. (±5° C.).

Nevertheless, depending on the intended application, this cycle can be optimized, e.g. to 30 minutes at 100° C.

The stripping composition of the invention is liquid and it is applied to the surface of the mold at very small thickness (generally of the order of one micrometer), preferably by hand, using a cloth or by means of wipes pre-impregnated with the composition.

Generally, it is not necessary to apply the composition to the mold for each molding operation. The number of molding operations that are possible using a coating of the composition of the present invention depends on the type of molding that is performed, and it generally remains equivalent to that obtained with usual stripping compositions based on solvent.

It should be observed that the stripping composition of the invention is effective for polymerizing any composite part in molds made of metal or of composite material, using epoxy resins of a class less than or equal to 180° C.

The invention claimed is:

1. A mold for making a heat curable composite material part, comprising:
   a liquid coating of a stripping composition on the mold,
   wherein, the stripping composition is solvent-free and is polymerized by heating, and
   the stripping composition comprises:
   100 parts by weight of a base ingredient constituted by an epoxy polydimethylsiloxane;
   0.5 to 10 parts by weight of a polymerization agent for polymerizing the base ingredient and constituted by a diaryliodonium salt;
   5 to 10 parts by weight of an anti-adhesion modulator constituted by an epoxy polydimethylsiloxane which is not polymerized and
   an anti-stick agent making the composition less tacky prior to polymerization, which comprises 8 to 12 parts by weight dodecyl monovinyl ether in the stripping composition and 8 to 12 parts by weight of cyclohexane dimethanol divinyl ether in the stripping composition, and
   wherein the base ingredient and the anti-adhesion modulator are different materials.

2. The mold according to claim 1, wherein
   the polymerization agent is 5 to 7 parts by weight.

3. The mold according to claim 2, wherein
   the polymerization agent is 6 parts by weight;
   the anti-adhesion modulate is 8 parts by weight; and
   the dodecyl monovinyl ether is present at a concentration of 11.4 parts by weight, and
   the cyclohexane dimethanol divinyl ether is present at a concentration of 11.4 parts by weight.

4. A wipe or cloth impregnated in the stripping composition of claim 1.

5. A method of molding a heat curable composite material part, comprising:
   forming a composite material in a mold coated by a liquid stripping composition, wherein,
   the surface of the mold is coated with the stripping composition to a thickness of about one micrometer,
   the stripping composition is solvent-free and is polymerized by heating, and
   the stripping composition comprises:
   100 parts by weight of a base ingredient constituted by an epoxy polydimethylsiloxane;
   0.5 to 10 parts by weight of a polymerization agent for polymerizing the base ingredient and constituted by a diaryliodonium salt;
   5 to 10 parts by weight of an anti-adhesion modulator constituted by an epoxy polydimethylsiloxane which is not polymerized; and
   an anti-stick agent making the composition less tacky prior to polymerization, which comprises 8 to 12 parts by weight dodecyl monovinyl ether in said stripping composition and 8 to 12 parts by weight of cyclohexane dimethanol divinyl ether in said stripping composition, and
   wherein the base ingredient and the anti-adhesion modulator are different materials.

6. The method according to claim 5, wherein the surface of the mold is coated with a wipe or a cloth impregnated in the stripping composition.

7. The method according to claim 5, wherein the polymerization cycle is 1 hour at 150° C.±5° C.

8. The method according to claim 5, wherein the polymerization cycle is 30 minutes at 100° C.

9. The method according to claim 5, wherein the composite material part formed in the mold is a helicopter blade or an element of such a blade.

* * * * *